US008803349B2

United States Patent
Rebsdorf et al.

(10) Patent No.: US 8,803,349 B2
(45) Date of Patent: Aug. 12, 2014

(54) WIND TURBINE AND ASSOCIATED CONTROL METHOD

(75) Inventors: Anders Varming Rebsdorf, Skanderborg (DK); Michael Friedrich, Silkeborg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 220 days.

(21) Appl. No.: 13/462,149

(22) Filed: May 2, 2012

(65) Prior Publication Data

US 2012/0282093 A1 Nov. 8, 2012

(30) Foreign Application Priority Data

May 6, 2011 (DK) .................................. 2011 70224

(51) Int. Cl.
*F03D 9/00* (2006.01)
*H02P 9/04* (2006.01)
*F03D 7/02* (2006.01)

(52) U.S. Cl.
CPC ......... *F03D 7/0212* (2013.01); *F05B 2270/321* (2013.01); *Y02E 10/723* (2013.01); *F05B 2270/32* (2013.01); *F03D 7/0228* (2013.01); *F03D 7/0268* (2013.01)
USPC ....................................................... 290/44

(58) Field of Classification Search
CPC ... F03D 7/0228; F03D 7/0212; F03D 7/0268; F03D 7/04; Y02E 10/723; F05B 2270/32; F05B 2270/321
USPC .......................... 290/44, 43, 54, 55; 416/1, 10
See application file for complete search history.

(56) References Cited

U.S. PATENT DOCUMENTS

| 4,557,666 | A | 12/1985 | Baskin et al. | |
|---|---|---|---|---|
| 6,441,507 | B1 | 8/2002 | Deering et al. | |
| 8,100,628 | B2 | 1/2012 | Frese et al. | |
| 2012/0134825 | A1* | 5/2012 | Grabau et al. | 416/144 |
| 2012/0201675 | A1* | 8/2012 | Friedrich | 416/1 |
| 2012/0288371 | A1* | 11/2012 | Grabau et al. | 416/1 |
| 2012/0294714 | A1* | 11/2012 | Friedrich | 416/1 |
| 2012/0294715 | A1* | 11/2012 | Rebsdorf | 416/1 |
| 2012/0294723 | A1* | 11/2012 | Grabau et al. | 416/223 R |
| 2012/0321482 | A1* | 12/2012 | Friedrich et al. | 416/241 R |
| 2013/0004312 | A1* | 1/2013 | Friedrich et al. | 416/1 |

FOREIGN PATENT DOCUMENTS

| CN | 101392725 A | 3/2009 |
|---|---|---|
| EP | 0 709 571 A2 | 5/1996 |
| WO | 01/71183 A1 | 9/2001 |

* cited by examiner

*Primary Examiner* — Javaid Nasri
(74) *Attorney, Agent, or Firm* — Roberts Mlotkowski Safran & Cole, P.C.; David S. Safran

(57) ABSTRACT

A method for controlling the position of blades of a two-bladed wind turbine when extreme conditions are detected or forecast for the wind turbine. When extreme conditions are detected or forecast, the wind turbine blades are positioned in a horizontal arrangement, and actively yawed such that a tip of one of the wind turbine blades points into the wind direction. The blades are yawed such as to actively follow the changing wind direction, resulting in a reduced surface area of the blades exposed to the extreme wind forces, due to the spear-like arrangement of the turbine blades. This reduced surface area provides for a reduction in the extreme loads which may be experienced by the wind turbine in such extreme wind conditions.

12 Claims, 4 Drawing Sheets

WIND TURBINE AND ASSOCIATED CONTROL METHOD

BACKGROUND OF THE INVENTION

1. Field of the Invention

The present invention relates to a wind turbine and a method of controlling such a wind turbine, in particular a method of controlling a wind turbine to reduce maximum loads experienced by the wind turbine during extreme wind conditions.

2. Description of Related Art

Wind turbines can often be located in areas having relatively predictable wind patterns, e.g., varying between ~15-25 m/s. However, during storm conditions wind speeds can often reach extreme levels capable of damaging wind turbine structures. For example, off-shore wind turbine installations may experience typhoon or hurricane conditions, wherein the wind speed may exceed 70 m/s during gusts. The high wind speeds mean that wind turbines intended for a site susceptible to extreme wind conditions have to be constructed with sturdier materials and/or additional reinforcement elements, in order to withstand the effects of the high winds possible in such areas, and to be rated suitable for use in the locations in question. Furthermore, high wind speeds during gusts can result in significant fatigue loads in the structural components of the wind turbine, which can lead to additional wear-and-tear on the wind turbine structure. Accordingly, it is of interest to find ways to reduce the impact of extreme wind conditions on wind turbines.

European Patent Application Publication No. 0 709 571 describes a two-bladed partial pitch wind turbine which reduces the effect of extreme wind conditions. The turbine comprises first and second rotor blades, having inner and outer blade sections, the outer blade sections pitchable relative to the inner blade sections. During high winds, the rotor blades are parked in a substantially horizontal alignment, and the outer section of the first blade is pitched to be at a 90 degree angle to the inner section of the first blade, while the outer section of the second blade is unpitched. The azimuth or yaw brake is released, and the rotor structure comprising the first and second rotor blades acts as a wind vane when exposed to high winds. As a result, the rotor is moved about the yaw axis such that the tip end of the first rotor blade is pointing directly into the oncoming wind, and consequently presents a reduced surface area against which the wind acts on. The reduced surface area results in reduced forces on the turbine during the high wind conditions, and reduced loading in the wind turbine structure.

Several problems exist for this solution however. For example, in the case of relatively small wind turbines or precisely-balanced wind turbines, there may be excessive wear-and-tear in the yawing system, as the rotor blades may be continually in rotational motion due to minor variations in the wind direction at the turbine. Such constant rotation can wear on the geared wheels, etc., present in wind turbine yawing systems, necessitating early repair and/or replacement.

Alternatively, in the case of relatively large wind turbines, i.e., turbines wherein the moment of inertia for yawing is relatively large, the wind vane (i.e., the rotor blades) will not be turned until the wind exceeds a wind speed sufficient to overcome the yawing inertia of the rotor blades. Accordingly, during an extreme wind condition, the wind may enter a period of calm for a period of time, during which the wind speed falls below the level required to yaw the rotor blades. If the wind direction changes during this period, and if the wind levels subsequently rise sharply, e.g., in the form of a gust, the full force of the extreme wind may impact on a majority of the surface area of the rotor blades, resulting in maximum loads experienced by the wind turbine structure.

Also, U.S. Pat. No. 8,100,628 B2 describes a solution where a rotor of a wind turbine is positioned in a rest position during a malfunction of the blade adjustment equipment. The rest position is preferably 90 degrees to the wind direction and the position of the nacelle can be adjusted according to a change in the wind direction, by activating the azimuth drive of the wind turbine. There is however not disclosed any method for deciding when to adjust the position of the nacelle, but performing a full correction of the position of the nacelle for every small change in wind direction will lead to excessive wear-and-tear in the yaw system as mentioned above.

SUMMARY OF THE INVENTION

It is a primary object of the invention to provide a wind turbine and an associated control method which provides improved performance at high wind speeds leading to extreme loads, and which overcomes the above problems.

Accordingly, there is provided a control method for reducing maximum loads experienced by a two-bladed wind turbine during extreme wind conditions, the wind turbine comprising a tower, a nacelle located at the top of said tower, a rotor hub rotatably mounted at the nacelle, a generator coupled to said rotor hub via a shaft, a pair of wind turbine blades of at least 35 meters length provided on said rotor hub, and a yaw system coupled to said nacelle, the method comprising the steps of:

- in the event of an extreme wind condition, providing said rotor blades in a substantially horizontal alignment;
- aligning said rotor blades such that a tip end of one of said rotor blades faces into the wind to reduce the extreme wind loads experienced by the rotor blades, wherein said step of aligning comprises actively yawing said nacelle and said rotor hub by actuating said yaw system;
- detecting the wind direction at said turbine, and wherein said step of aligning is based on said detected wind direction;
- detecting the current direction of said tip end of said rotor blades, and wherein said step of aligning is performed when the difference between the detected tip end direction and said detected wind direction exceeds a threshold error margin value; and
- detecting the current wind speed at the turbine, and wherein said threshold error margin value is selected based on the detected wind speed at said wind turbine.

As the rotor blades are aligned with the wind direction such that one of the tips of the rotor blades faces the oncoming wind, this reduces the surface area acted on by the extreme winds, and accordingly reduces the magnitude of the extreme loads experienced by the turbine structure. By actively yawing the rotor blades into the wind, this provides for greater control of the wind turbine during such extreme wind conditions, allowing for the rotor blade alignment and yawing to be managed based on the current conditions at the wind turbine. Such active yawing ensures accurate alignment of the wind turbine blades for all dimensions of wind turbine.

The method further comprises the step of detecting the wind direction at the turbine, and the step of aligning is based on the detected wind direction.

By detecting the current direction of the wind at the turbine, the rotor blades can be accurately aligned with the wind direction, to reduce the surface area of the blade facing the wind, and accordingly reduce the magnitude of the loads experienced by the wind turbine structure.

The method also comprises the step of detecting the current direction of the tip end of the rotor blades, and wherein the step of aligning is performed when the difference between the detected tip end direction and the detected wind direction exceeds a threshold error margin value.

While the wind may come from a particular general direction (e.g., South-West), in reality the wind will almost constantly be varying in direction around the general wind direction (e.g., of the order of 3-4 degrees variation). Accordingly, if the aligning is carried out only when the difference between the wind direction and the current direction of the rotor blades is more than a threshold value, this prevents the rotor blades from constantly yawing in response to every minor variation in the wind direction. As a result, the effect of wear-and-tear on the wind turbine yaw system components is minimized, resulting in increased lifetime of the components.

Preferably, the threshold error margin value is approximately +/−8 degrees.

The method according to the invention comprises the step of detecting the current wind speed at the turbine, and wherein the threshold error margin value is selected based on the detected wind speed at the wind turbine.

During the shut-down period of a wind turbine for extreme wind conditions, the wind strength (i.e., the speed of the wind) may vary from extremely high levels to periods of relative calm, wherein the wind is at low level speeds. Accordingly, there may be less urgency to yaw the rotor blades when at low wind speeds, while at high wind speeds it may be important to have the rotor blades closely follow the wind direction, in order to minimize the loads experienced by the wind turbine structure. By varying the threshold error margin value based on the current wind speed, greater control can be exercised over the turbine operation during extreme wind conditions, and the use of the yawing system can be optimized to current requirements.

Preferably, the method comprises the step of selecting a threshold error margin value, comprising selecting a first error margin value for wind speeds below a threshold wind speed and a second error margin value for wind speeds above the threshold wind speed.

The introduction of a threshold wind speed allows for the error margin value to be varied on either side of a threshold wind speed, so that the rotor blades may have different yawing conditions dependent on the current wind conditions at the turbine. Accordingly, the wear-and-tear on the turbine yawing systems may be reduced, to optimize turbine performance.

Preferably, the first error margin value varies proportionally with wind speed, for wind speeds below the threshold wind speed. Preferably, the second error margin value is a constant for wind speeds above the threshold wind speed.

Preferably, the threshold wind speed is approximately 12 m/s. Preferably, the second error margin value is selected at approximately 8 degrees for wind speeds above the threshold wind speed. Preferably, the first error margin value varies linearly with wind speed for wind speeds below the threshold wind speed. Preferably, the first error margin value varies linearly from 15 degrees at a wind speed of 2.5 m/s to 8 degrees at a wind speed of 12 m/s.

Preferably, the step of aligning is performed for wind speeds above a minimum wind speed value.

If the wind speed at the turbine is of a considerably low level, in that no significant loading forces are produced in the turbine structure, the yawing of the turbine may be stopped completely, irrespective of current wind direction, to conserve power, and turbine components. Preferably, the minimum wind speed value is approximately 2.5 m/s.

Preferably, the yaw system comprises a controller for yawing the nacelle such that the rotor blades are oriented to face the detected wind direction, and wherein the step of aligning comprises applying an offset of approximately +/−90 degrees to the input of the controller, such that the yaw system adjusts the rotor blades to be oriented to face at an angle of 90 degrees to the detected wind direction.

By simply introducing a 90 degree offset into the input to the yawing system, the method may be relatively easily applied to existing wind turbines, removing the need for additional relatively complicated control circuitry and/or yawing systems.

Preferably the generator is a permanent magnet generator.

Preferably, the step of providing the rotor blades in a substantially horizontal alignment comprises locking the rotor blades in a substantially horizontal position.

As the rotor blades can be locked into substantially horizontal alignment, this ensures that the blades will be maintained in a configuration wherein they will be parallel with the wind direction at the turbine, and accordingly will present a reduced surface area which is acted on by the extreme winds.

Preferably, the step of locking comprises applying a short circuit across at least one of the output terminals of the generator, resulting in an electrical load in the generator to generate a braking torque in the shaft to brake the rotor hub.

By applying a short circuit across the generator output terminals, a torque will be produced in the generator shaft when moving the shaft. This torque force in the generator acts to resist any angular motion of the shaft and the connected rotor blades, effectively braking or locking the blades in position. This can be controlled to lock the rotor blades in a substantially horizontal position, acting as a passive brake in the generator.

Alternatively, the step of locking comprises applying a DC current across output terminals of the generator, resulting in a generator torque in the generator to generate a braking torque in the shaft to brake the rotor hub.

Applying a DC current to the coils of a generator creates a torque acting on the shaft of the wind turbine, which acts to brake the rotation of the generator shaft. This comprises an active electrical brake for the wind turbine.

It is also understood that the step of locking may comprise applying any suitable locking or braking mechanism for positioning the rotor blades in a substantially horizontal alignment, e.g., disk brakes may be applied to the rotor hub and/or wind turbine shaft.

Preferably, the method comprises the step of switching to an emergency power supply to power the yaw system.

During extreme wind conditions, power connections to the greater power grid may be severed due to the hazardous environmental conditions. In this case, the wind turbine is operable to deploy emergency backup power, to actuate the active yawing of the wind turbine rotor blades. Such backup power may also be used to operate the braking mechanism, e.g., if the wind turbine utilises DC braking in the generator.

Preferably, the step of switching comprises deploying a secondary wind turbine to generate emergency power in the extreme wind conditions.

A secondary, relatively small, wind turbine may be deployed somewhere on the wind turbine structure, in order to deliver a backup emergency power supply. The small turbine may be rated to operate in the extreme wind conditions at the wind turbine.

Preferably, the wind turbine is a two-bladed partial pitch wind turbine, the rotor blades having an inner blade section and an outer blade section, the outer blade section pitchable relative to the inner blade section, wherein the method comprises the step of pitching a first of the outer blade sections to a substantially 90 degree pitch angle while maintaining a second of the outer blade sections at a substantially 0 degree pitch angle.

By pitching the outer blade sections at approximate right angles to one another, this helps to more evenly distribute forces in the wind turbine structure. In the event of a sudden gust of wind coming from a different direction to the detected direction, the different pitch of the outer blade sections means that the full force of the gust is not acting on the full blade surfaces, and accordingly the loading experienced by the wind turbine structure is reduced. Preferably, the first outer blade section is pitched at approximately 87 degree pitch angle. Preferably, the second outer blade section is pitched at between −3 to +3 degree pitch angle.

Preferably, the step of pitching is arranged such that the first outer blade section comprises the tip end of the rotor blades facing into the wind.

There is also provided a wind turbine comprising
a tower,
a nacelle located at the top of the tower,
a rotor hub rotatably mounted at the nacelle,
a generator coupled to the rotor hub via a shaft,
a pair of wind turbine blades of at least 35 meters length provided on the rotor hub, and
a yaw system coupled to the nacelle, wherein the wind turbine further comprises a controller operable to implement the above method.

An embodiment of the invention will now be described, by way of example only, with reference to the accompanying drawings.

DETAILED DESCRIPTION OF THE INVENTION

Figure 1:
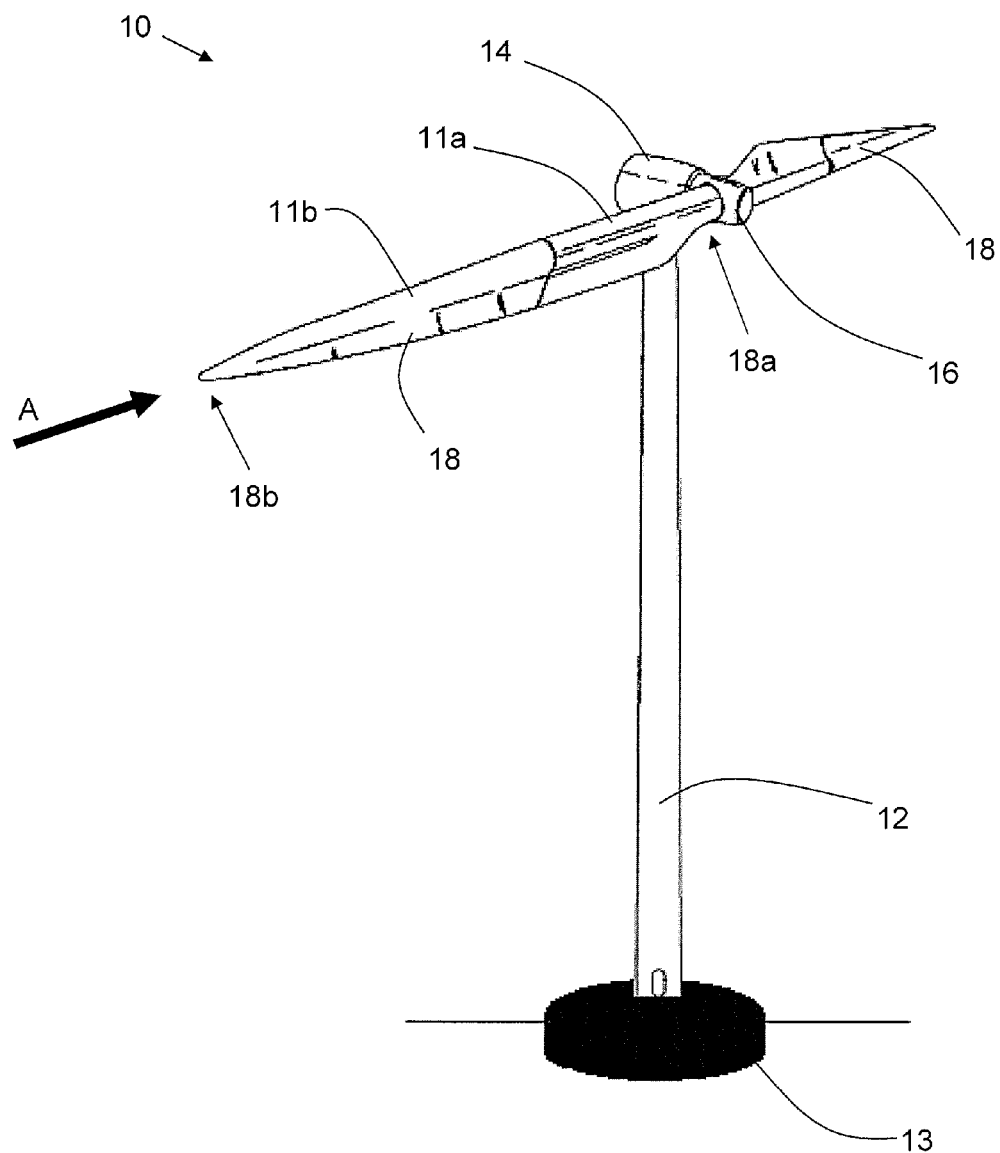
FIG. 1 is a perspective view of a two-bladed wind turbine according to the invention.
Figure 2:
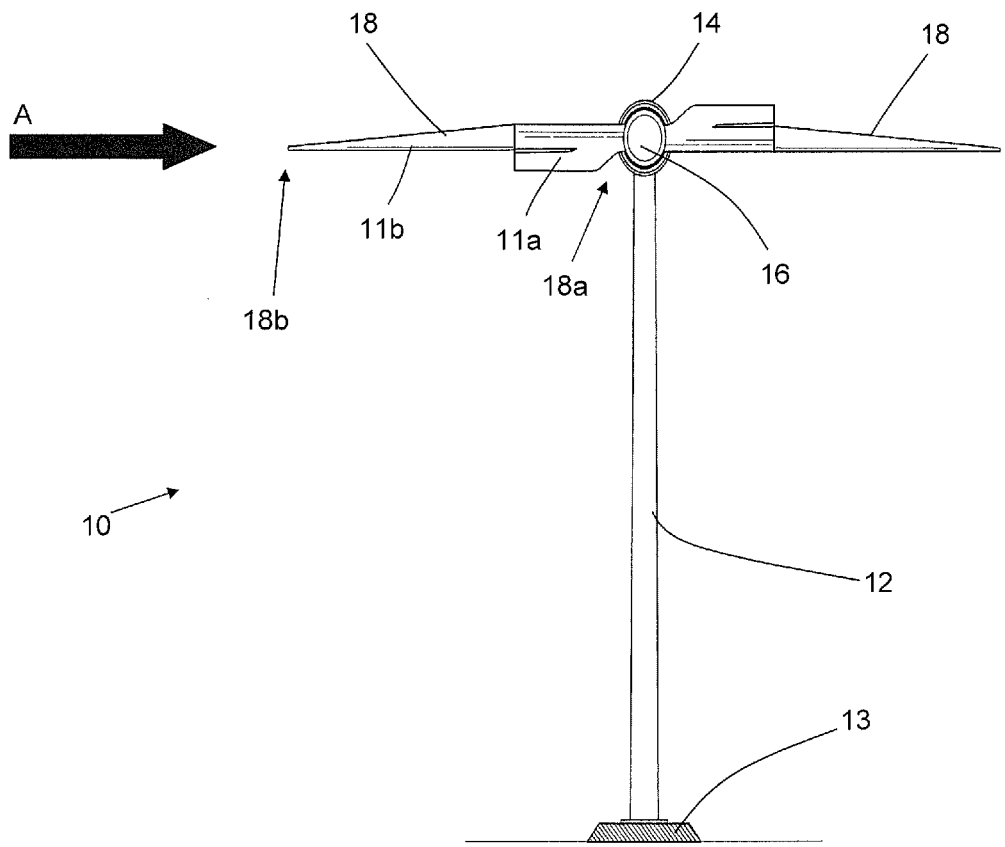
FIG. 2 is a front plan view of the wind turbine of FIG. 1.
Figure 3:
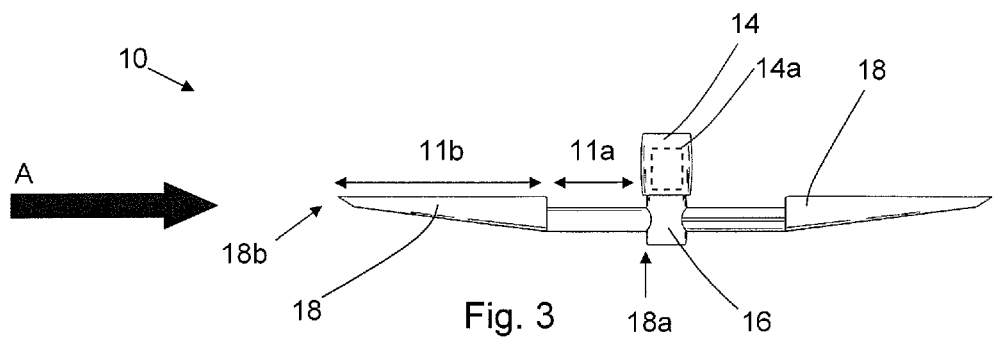
FIG. 3 is a top plan view of the wind turbine of FIG. 1.

With reference to FIGS. 1-3, a wind turbine according to the invention is indicated generally at 10. The wind turbine 10 comprises a wind turbine tower 12, a nacelle 14 provided at the top of the tower 12, and a rotor hub 16 provided at the nacelle 14. A pair of partial pitch rotor blades 18 is provided on the rotor hub 16. In FIGS. 1 & 2, the tower 12 is shown provided on a wind turbine base 13, which may comprise any suitable wind turbine foundation.

Each of the partial pitch rotor blades 18 comprises a blade body having a root end 18a mounted to the rotor hub 16 and a distal tip end 18b. The rotor blades 18 comprise an inner blade section 11a provided at the root end 18a, and an outer blade section 11b provided at the tip end 18b. The rotor blades 18 further comprise a pitch system (not shown) provided at the junction between the inner blade section 11a and the outer blade section 11b. (For the purposes of clarity, the features of the blades 18 are indicated in FIGS. 1-3 with regard to one of the blades illustrated, but are equally found on both blades.)

The pitch system is operable to pitch the outer blade section 11b relative to the inner blade section 11a. In FIG. 1, the rotor blades 18 are shown unpitched (i.e., the outer blade sections 11b are pitched at a 0 degree pitch angle), while in FIGS. 2 and 3 the rotor blades 18 are shown at a 90 degree pitch angle.

While the present embodiment describes the use of the invention for a partial pitch wind turbine, it will be understood that the invention may apply to any suitable two-bladed wind turbine configuration, and is not limited to a partial pitch wind turbine.

The wind turbine 10 further comprises a controller (not shown) which is operable to implement a safety shutdown procedure in the event of extreme wind conditions. Such a controller may be a self-contained control device provided in the wind turbine structure, and/or may be communicatively coupled to a remote control station capable of managing the wind turbine operation from a remote location.

Dependent on the prevailing wind conditions in a region, the design considerations of the wind turbine structure may be altered accordingly. By an extreme wind condition, it will be understood that this refers to very high wind speeds which can occur in the vicinity of the wind turbine tower, and for which the wind turbine towers and foundations must be designed to cope with adequately. In particular, the International Electrotechnical Commission (IEC) specifies extreme wind conditions as wind shear events, as well as peak wind speeds due to storms and rapid changes in wind speed direction. A wind turbine is expected to withstand extreme wind conditions of a specified wind speed to qualify as a particular class of IEC turbine (for example, an extreme wind of 70 m/s wind speed is currently specified for an IEC Class I turbine).

It will be understood that the definition of such extreme wind conditions may depend on several factors, e.g., the maximum wind speed rating for the desired class of wind turbine, and/or the wind speed which would be classified as a once in 10/50/100 years event (relative to the normal prevailing wind conditions at the wind turbine site).

For most regions in Europe, a wind speed of greater than 20 meters per second (m/s) may be regarded as an extreme wind condition. However, in typhoon- or hurricane-prone regions in Asia, such a turbine may need to be rated to withstand winds of up to 70 m/s. Thus, the design of the turbine structure may involve more use of reinforcement elements. For such a reinforced turbine, an extreme wind condition may be at a higher level than in the case of a European-based turbine. In general, a weather system comprising sustained winds of at least 33 meters per second (or 119 km/hour) is classified as a typhoon or hurricane.

In the event of a detected or forecast extreme wind condition, firstly the turbine 10 is stopped, and rotation of the rotor 16 and blades 18 halted. Preferably, the blades 18 are stopped such that the blades 18 are positioned in a substantially horizontal alignment, as can be seen in FIGS. 1-3. By a substantially horizontal alignment, it will be understood that the blades 18 are arranged to be substantially parallel to the ground level (or sea level) relative to the wind turbine, e.g., +/−5 degrees.

When the blades 18 are horizontally aligned, the wind turbine 10 is operable to detect the current wind direction at the turbine, and to yaw the wind turbine blade 18 such that the tip end 18b of one of the blades 18 is pointed in the direction that the current wind is coming from, e.g., if the wind is detected to be South Westerly, the wind turbine blades 18 are actively yawed using the turbine yaw mechanism (not shown) until the blades 18 are aligned with the wind direction, such that one of the tip ends 18b will point in a South Westerly direction, and the opposed tip end 18b points in a North Easterly direction.

As the blades 18 are aligned with the direction of the wind (indicated by arrow A), the surface area of the blades 18 presented to the wind is minimized (when compared with the situation when the wind may be acting on the surface along the entire longitudinal length of the blade). As the surface area is minimized, accordingly the load forces experienced by the wind turbine structure due to the extreme wind are also minimized. This leads to a reduction in the extreme loads experienced by the wind turbine 10. An advantage of such a reduction in extreme loads is that the construction requirements for the wind turbine structure may also be reduced, resulting in less manufacturing cost and effort.

As the blades 18 are actively yawed to point into the wind direction, this ensures that the blades 18 will be accurately aligned with the wind direction at the turbine, regardless of turbine size and/or blade balancing.

It will be understood that the wind turbine 10 may comprise any suitable devices for determining wind speed, e.g., an anemometer, and wind direction, e.g., a wind vane provided on the wind turbine structure. Additionally or alternatively, the wind turbine 10 is operable to receive information regarding a forecasted wind direction for the turbine, and to yaw the wind turbine blades 18 to align with the forecasted wind direction, e.g., in anticipation of extreme wind speeds from the forecasted direction.

The wind turbine controller may be operable to regulate the active yawing performed on the wind turbine blades 18, to provide for effective and efficient operation of the wind turbine 10. For example, in a first aspect, the yaw rate or speed may be determined by the wind speed at the turbine 10. In the case of high wind speeds, it may be important that the blades 18 quickly follow the direction of the wind at the turbine 10, to ensure that the extreme loads experienced by the wind turbine are minimized. However, in cases where the wind speeds are relatively low and any associated load forces accordingly low, the yaw speed may be reduced in order to reduce the possible effects of wear on the yawing mechanism due to high-speed yawing.

Additionally or alternatively, the yawing of the blades 18 is only performed when the difference between the currently detected wind direction at the turbine 10 and the current yaw angle of the blades 18 exceeds a pre-defined threshold error margin angle. The current yaw angle is detected by means of a yaw position sensor (marked with dotted lines 34a in FIG. 5). This allows for a limited degree of fluctuation and variation of the wind direction around a set point, which reduces wear and tear of the yawing mechanism due to overuse of the yaw system to constantly follow the exact wind direction.

Further additionally or alternatively, the yawing may only be performed when the wind speed at the turbine 10 exceeds a pre-defined minimum wind speed. This is to prevent unnecessary yawing of the blades 18 at times when the wind load forces at the turbine 10 are already minimal.

Figure 4:
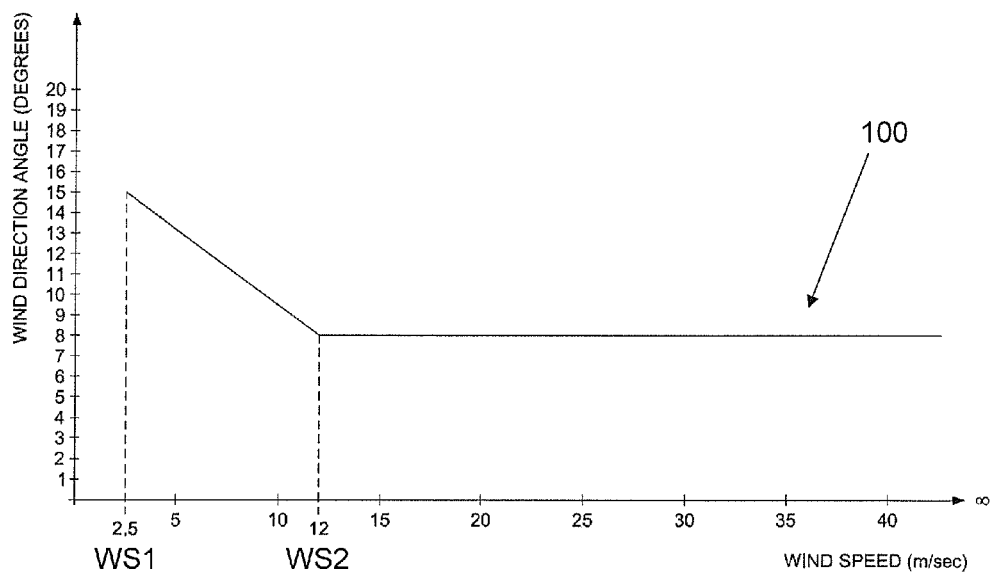
FIG. 4 is a plot illustrating a sample relationship between threshold wind direction and wind speed for the control method of the invention.

With reference to FIG. 4, a graph of error margin angle against wind speed is shown. A sample threshold error margin angle is indicated at 100 (i.e., the angle between the detected wind direction and the current yaw angle of the blades 18 at which the blades are yawed to point into the wind). It will be understood that the values on the y-axis of the graph of FIG. 4 refer to the magnitude of the angle, and may be + or − degrees.

As can be seen in FIG. 4, for wind speeds below a first wind speed WS1 (in this embodiment, approximately 2.5 m/s), the yaw mechanism is not activated.

For wind speeds between WS1 and a second wind speed WS2 (in this embodiment, approximately 12 m/s), the yaw system is activated to yaw the wind turbine blades 18 to point into the wind, but only when the detected wind direction exceeds the threshold error margin angle 100 from the current yaw angle of the blades 18. Between WS1 and WS2, the threshold error margin angle 100 varies dependent on the wind speed detected at the turbine 10. In the embodiment shown, the threshold error margin angle 100 varies from an angle of approximately 15 degrees at WS1 to an angle of approximately 8 degrees at WS2.

For wind speeds above WS2, the threshold error margin angle 100 is preferably constant, and sets a defined threshold for all high wind speeds. In the embodiment shown, this threshold is approximately 8 degrees.

The use of such a threshold angle means that the yawing system is only activated when necessary, and avoids excessive wear-and-tear on the wind turbine systems.

It will be understood that different configurations of threshold error margin angle 100 may be used, for example the threshold may vary over substantially all wind speeds, e.g., derived by a formula based on current wind speed.

In a preferred embodiment, the blades 18 are locked in the horizontal alignment. This locking action may comprise a mechanical brake applied to the wind turbine shaft (not shown) to prevent blade rotation, actuating a locking mechanism to prevent rotation of the rotor 16 and blades 18 relative to the wind turbine nacelle 14 (e.g., extending locking bolts which are fixed to the nacelle 14 into corresponding apertures provided on the rotor 16), and/or applying an electrical brake to the wind turbine 10 to prevent turbine rotation.

An electric brake may be provided as a passive electric brake or an active electric brake, and is applied to the electrical generator (marked with the dotted line 14a in FIG. 3) of the wind turbine 10, which is coupled to the wind turbine rotor 16 via a turbine shaft.

A passive electric brake may be provided by applying a short circuit across the output terminals of the wind turbine generator (e.g., a permanent magnet generator), to form a torque or braking force within the generator itself which resists the rotation of the shaft and the connected rotor blades.

An active electrical break may be provided by applying a DC current to the coils of a permanent magnet generator, to form a relatively stronger torque or braking force within the generator. Such an active brake can be effectively controlled, allowing for the position of the rotor blades 18 to be controlled by the appropriate application of the active brake.

One advantage of using an electrical brake in the generator to lock the rotor 16, is that the electrical brake is a "soft" brake, and therefore, turbulent wind induced loads will not create large stresses in the turbine structure. This softness is partly caused by the nature of the magnetic forces in the generator allowing a few degrees turning of the rotor and generator without generating a large torque. Furthermore, the wind turbine 10 may comprise a shaft formed from flexible material, allowing for a degree of movement of the shaft due to the forces acting on the rotor blades 18.

The use of electrical braking in a permanent magnet generator will result in only a few degrees of slip of the rotor, as permanent magnet generator in general will comprise a large number of poles, e.g., ~130 poles.

The wind turbine 10 may further comprises an emergency or backup power supply, which may be deployed in the event of extreme wind conditions to ensure that there is no interruption in the power supply of the wind turbine 10. As such extreme wind conditions may result in a loss of connection to a regional power grid, and as the wind turbine 10 will not be generating power in such conditions, the use of a backup power supply ensures that the operation of the yawing mechanism of the wind turbine 10, as well as any potential electrical brakes, is uninterrupted.

The backup power supply may be provided in the form of a battery system or emergency power generator (e.g., a diesel generator) located in the wind turbine structure (the battery system may be charged during normal turbine operation). Additionally or alternatively, the backup power supply may be provided in the form of a supplementary turbine generator which can be deployed in the event of the initiation of a safety shutdown procedure. Examples of suitable supplementary turbines can include a wave power generator, a tidal power generator, and/or a high-speed wind turbine. In the case of a high-speed wind turbine, such a device may be provided on an extendible arm which is normally housed within the wind turbine tower 12 or nacelle 14, and which can be deployed in the event of extreme wind conditions to provide a backup power source. It will be understood that such supplementary turbines will be designed to operate in such extreme wind conditions which necessitate the initiation of a safety shutdown procedure.

Figure 5:
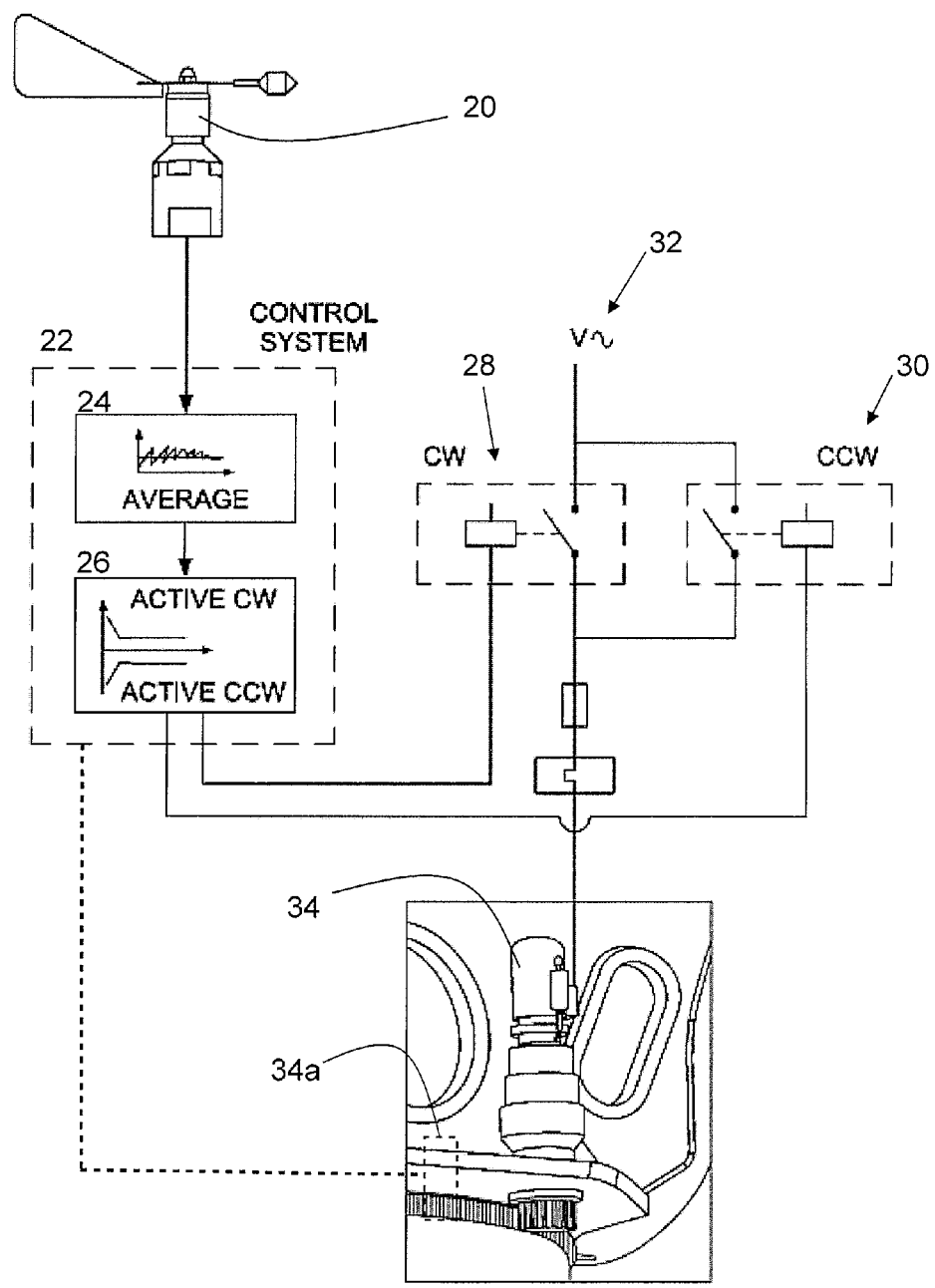
FIG. 5 is an illustration of a sample control system for use with the wind turbine of FIG. 1.

With reference to FIG. 5, an illustration of the control system used in a wind turbine 10 according to the invention is shown. Once a hazardous or extreme wind condition has been detected, the wind turbine blades 18 are provided and/or locked in a substantially horizontal arrangement, as described above. A wind vane 20 is provided on the wind turbine structure and is used to determine the current wind direction at the wind turbine 10.

The detected current wind direction is processed by a controller 22, and may be averaged (step 24) over a period of time to provide an average current wind direction (such averaging acting to smooth out any high frequency changes in direction and ensure smoother operation of the yawing system).

The detected wind direction can then be compared (step 26) against a defined threshold error margin angle (as in FIG. 4). At this step, the controller 22 is operable to determine if the wind direction is above the threshold error margin 100; if the current wind speed is above the minimum wind speed WS1 for activating the yawing system; and if the wind direction is in a positive or negative direction—i.e., should the yawing be in a clockwise (CW) or counter-clockwise (CCW) direction.

Dependent on the outcome of the comparison step 26, the controller 22 is operable to actuate CW or CCW yawing circuits, 28, 30 respectively, which are driven by power supply 32. It will be understood that power supply 32 may comprise a coupling to a general power grid, or may be provided by an emergency or backup power supply, as described above.

The CW and CCW circuits 28, 30 are coupled to a wind turbine yaw mechanism 34, and are operable to yaw the wind turbine nacelle 14, rotor 16 and substantially horizontal rotor blades 18 into position in line with the current wind direction A at the wind turbine 10.

It will be understood that the system of the present invention may be relatively easily incorporated into existing control schemes and controllers for yaw control of wind turbines, as the yawing of the wind turbine blades such that a tip end of one of the blades points in the direction of the current wind may be accomplished by introducing an approximately 90 degree offset into an existing system configured to align the wind turbine blades to face the current wind direction. Preferably, the offset is approximately 87 degrees, for situations when the blades are approximately +/−3 degrees to the direction of the wind during normal operation.

While the above embodiment describes the use of the invention for an onshore wind turbine, it will be understood that the invention may equally apply to wind turbines for use in an off-shore environment.

The use of the active yawing system of the control method described herein ensures efficient and effective control of a wind turbine during extreme wind conditions, to reduce wind loads experienced by the wind turbine structure, leading to an associated saving in wind turbine cost and manufacture.

The invention is not limited to the embodiment described herein, and may be modified or adapted without departing from the scope of the present invention.

What is claimed is:

1. A control method for reducing maximum loads experienced by a two-bladed wind turbine during extreme wind conditions, the wind turbine comprising a tower, a nacelle located at the top of the tower, a rotor hub rotatably mounted at said nacelle, a generator coupled to said rotor hub via a shaft, a pair of wind turbine blades of at least 35 meters length provided on said rotor hub, and a yaw system coupled to said nacelle, the method comprising the steps of:

in the event of an extreme wind condition, placing said rotor blades in a substantially horizontal alignment;

aligning said rotor blades such that a tip end of one of said rotor blades faces into the wind to reduce the extreme wind loads experienced by the rotor blades, wherein said step of aligning comprises actively yawing said nacelle and said rotor hub by actuating said yaw system;

detecting the wind direction at said turbine, and wherein said step of aligning is based on said detected wind direction;

detecting the current direction of said tip end of said rotor blades, and wherein said step of aligning is performed when the difference between the detected tip end direction and said detected wind direction exceeds a threshold error margin value; and detecting the current wind speed at the turbine, wherein said threshold error margin value is selected based on the detected wind speed at said wind turbine.

2. The method of claim 1, comprising the further step of selecting a threshold error margin value, comprising selecting a first error margin value for wind speeds below a threshold wind speed and a second error margin value for wind speeds above said threshold wind speed.

3. The method of claim 2, wherein said first error margin value is varied proportionally with wind speed for wind speeds below said threshold wind speed, and wherein said second error margin value is a constant for wind speeds above said threshold wind speed.

4. The method of claim 1, wherein said step of aligning is performed for wind speeds above a minimum wind speed value.

5. The method of claim 1, wherein the yaw system comprises a controller for yawing said nacelle such that said rotor blades are oriented to face the detected wind direction, and wherein said step of aligning comprises applying an offset of approximately +/−90 degrees to the input of said controller, such that the yaw system adjusts the rotor blades to be oriented to face at an angle of 90 degrees to the detected wind direction.

6. The method of claim 1, wherein said step of providing said rotor blades in a substantially horizontal alignment comprises locking said rotor blades in a substantially horizontal position.

7. The method of claim 6, wherein said step of locking comprises applying a short circuit across at least one of the output terminals of said generator, resulting in an electrical load in the generator to generate a braking torque in said shaft to brake the rotor hub.

8. The method of claim 6, wherein said step of locking comprises applying a DC current across output terminals of said generator, resulting in a generator torque in said generator to generate a braking torque in said shaft to brake the rotor hub.

9. The method of claim 1, comprising the further step of switching to an emergency power supply to power said yaw system.

10. The method of claim 1, wherein the wind turbine is a two-bladed partial pitch wind turbine, the rotor blades having an inner blade section and an outer blade section, the outer blade section being pitchable relative to the inner blade section, comprising the further step of pitching a first of said outer blade sections to a substantially 90 degree pitch angle while maintaining a second of said outer blade sections at a substantially 0 degree pitch angle.

11. The method of claim 10, wherein said step of pitching is arranged such that said first outer blade section comprises the tip end of said rotor blades facing into the wind.

12. A wind turbine comprising
a tower,
a nacelle located at the top of said tower,
a rotor hub rotatably mounted at said nacelle,
a generator coupled to said rotor hub via a shaft,
a pair of wind turbine blades of at least 35 meters length provided on said rotor hub,
a yaw system coupled to said nacelle,
a wind direction detector positioned to detect wind direction at said turbine,
a blade tip end direction detector for detecting the direction of a tip end of the blades,
a wind speed detector at said wind turbine for detecting wind speed at said wind turbine, and
a controller operable to:
in the event of an extreme wind condition, cause said yaw system to actively yaw said nacelle and said rotor hub so as to place said rotor blades in a substantially horizontal alignment with the tip end of one of said rotor blades pointing into the wind to reduce the extreme wind loads experienced by the rotor blades based upon a wind direction detected at said turbine by said wind direction detector and a detected current direction of the tip end of said rotor blades detected by said blade tip end direction detector, when a difference between the detected tip end direction and said detected wind direction exceeds a threshold error margin value that is based on wind speed detected at said wind turbine by said wind speed detector.

* * * * *